Aug. 4, 1925.

G. SIDLER

ANIMAL TRAP

Filed Aug. 18, 1924

1,548,761

Gotthard Sidler
INVENTOR

BY Victor J. Evans
ATTORNEY

WITNESS:

Patented Aug. 4, 1925.

1,548,761

UNITED STATES PATENT OFFICE.

GOTTHARD SIDLER, OF HEWLETT, NEW YORK.

ANIMAL TRAP.

Application filed August 18, 1924. Serial No. 732,830.

*To all whom it may concern:*

Be it known that I, GOTTHARD SIDLER, a citizen of Switzerland, residing at Hewlett, L. I., in the county of Nassau and State of New York, have invented new and useful Improvements in Animal Traps, of which the following is a specification.

This invention relates to improvements in animal traps.

The principal object of the invention is the provision of a trap adapted to be placed at the entrance of a mouse or rat hole whereby the animal may be caught or trapped upon his exit from said hole.

Another object of the invention is to provide a trap which may be set to catch mice or like pests without the aid of bait, which bait is not always available.

A further object of the invention is to provide an animal trap with a trigger which is most sensitive, and which must be touched by the animal on his attempt to pass the same when making his exit through a restricted opening.

A still further object of the invention resides in the construction of a trap which is simple in construction, cheap of manufacture and positive in its action.

With these and other objects in view, the inventioin resides in certain novel construction and combination and arrangement of parts, the essential features of which are hereinafter fully described, are particularly pointed out in the appended claim, and are illustrated in the accompanying drawing in which:—

Figure 1:
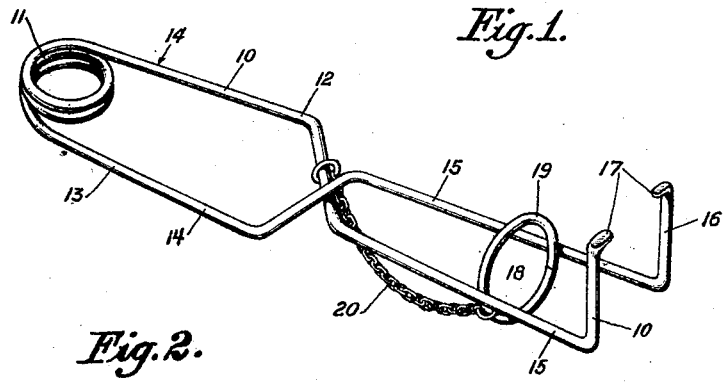
Figure 1 is a perspective view of my improved trap in set position.
Figure 2:
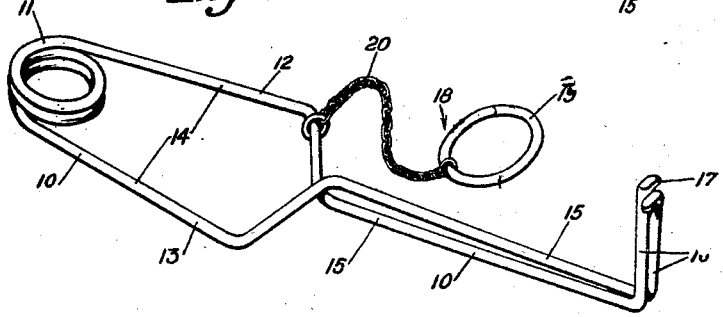
Figure 2 is a similar view, but showing the trap in closed position.
Figure 3:
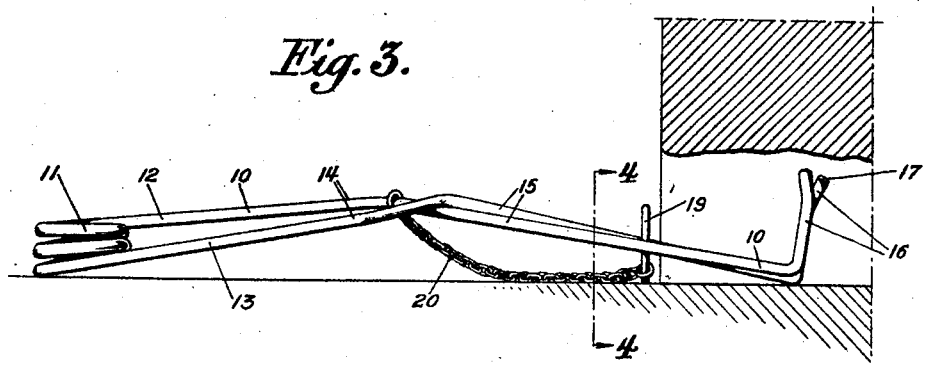
Figure 3 is a side elevation of the trap in set position.
Figure 4:
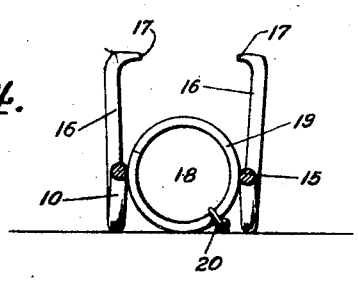
Figure 4 is a vertical transverse sectional view on the line 4—4 of Figure 3.

Referring more particularly to the drawing, the reference numeral 10 designates a single piece of relatively, springy, heavy wire, which is twisted midway between its ends to provide a coil 11. The branches 12 and 13 of the piece of material are each bent outwardly and upwardly from the coil as at 14, and thence inwardly to a point slightly beyond the longitudinal axial center of the coil where they cross and extend parallel to each other and downward to form legs 15. The free ends of the legs are bent upward to provide jaws 16, each of which is provided with an inwardly extending tooth 17, which teeth are arranged out of alignment with each other so as to overlap when the jaws are in closed position. When placed upon a flat surface, the bottom of the coil 11 and the base of the jaws 16 serve to support the device in a rigid position.

In order to hold the jaws 16 in opened or set position, I provide a trigger means 18 which comprises a ring 19 and which ring is connected to one of the branches between the coil 11 and the crossing point of the same, by a flexible connection 20, in the nature of a chain.

In practice, when it is desired to set the trap, the portions 14 serve as handles and when pressure is applied thereto, the jaws 16 will move to an open position after which the ring 19 is placed between the legs 15 of the respective branches. As the surface of the ring and the legs are round, it is necessary to have the axial center of the ring in alignment with the axial center of the legs otherwise the ring would not hold the jaws in a spread position against the tension of the coil 11. By this arrangement, it will be seen that the trigger is most sensitive and the least touch will release the same. In use, the trap is first set as hereinbefore mentioned, and inserted in the mouse opening with the jaw end first. The animal in making his exit from the opening must pass through the jaws and upon striking the ring, the jaws will snap closed about the body of the animal. The animal may be released by pressing the portions 14 to expand the jaws.

From the foregoing description, it will be seen that I have provided a trap which is extremely simple in construction, and which does not rely upon bait for luring the animal, which is sometimes unavailable. I wish it to be understood that I do not limit myself to the particular animals mentioned herein, as the trap may be constructed of various sizes for trapping animals which burrow into the ground.

While I have described what I deem to be the most desirable embodiment of my invention, it is obvious that many of the details may be varied without in any way departing from the spirit of my invention and I therefore do not limit myself to the exact details of construction herein set forth nor to anything less than the whole of my invention limited only by the appended claim.

What is claimed as new is:—

A trap comprising a single length of spring wire twisted midway between its ends to form a coil, the branches of said length of wire extending outwardly and upwardly in spaced relation and crossed, thence downward, an upwardly bent portion on the free end of each branch, an inwardly extending tooth on the extreme end of each portion, the teeth of said portions co-acting to form a clamping jaw, and a ring connected to one of said branches by a flexible connection for insertion between the branches adjacent the clamping jaw for holding said jaw in a set position, the branches engaging said ring on a plane in alignment with the axis of said ring.

In testimony whereof I have affixed my signature.

GOTTHARD SIDLER.